US006456973B1

(12) United States Patent
Fado et al.

(10) Patent No.: US 6,456,973 B1
(45) Date of Patent: Sep. 24, 2002

(54) TASK AUTOMATION USER INTERFACE WITH TEXT-TO-SPEECH OUTPUT

(75) Inventors: Frank Fado, Highland Beach; Peter J. Guasti, Coral Springs; Amado Nassiff, Boynton Beach; Harvey Ruback, Loxahatchee; Ronald E. VanBuskirk, Indiantown, all of FL (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/416,687

(22) Filed: Oct. 12, 1999

(51) Int. Cl.[7] .................... G10L 15/22

(52) U.S. Cl. .................... 704/260; 704/270; 704/275; 345/156; 345/716

(58) Field of Search .................... 704/260, 270, 704/275; 379/88.02; 345/156, 716

(56) References Cited

U.S. PATENT DOCUMENTS

| | | | | |
|---|---|---|---|---|
| 5,583,801 A | * 12/1996 | Croyle et al. | ............... | 364/580 |
| 5,774,859 A | * 6/1998 | Houser et al. | .............. | 704/275 |
| 5,850,629 A | * 12/1998 | Holm et al. | ................ | 704/260 |
| 5,983,284 A | * 11/1999 | Argade | .......................... | 710/1 |
| 6,049,328 A | * 4/2000 | Vanderheiden | .............. | 345/173 |
| 6,081,780 A | * 6/2000 | Lumelsky | ................... | 704/260 |
| 6,088,428 A | * 7/2000 | Trandal et al. | ........... | 379/88.02 |
| 6,125,347 A | * 9/2000 | Cote et al. | .................. | 704/275 |
| 6,199,076 B1 | * 3/2001 | Logan et al. | ............... | 707/501 |
| 6,243,676 B1 | * 6/2001 | Witteman | .................. | 704/243 |
| 6,246,672 B1 | * 6/2001 | Lumelsky | ................... | 370/310 |
| 6,311,159 B1 | * 10/2001 | Van Tichelen et al. | ..... | 704/275 |
| 6,324,507 B1 | * 11/2001 | Lewis et al. | ................ | 704/243 |
| 6,330,499 B1 | * 12/2001 | Chou et al. | ................... | 701/33 |

* cited by examiner

*Primary Examiner*—Tālivaldis Ivars Šmits
*Assistant Examiner*—Susan McFadden
(74) *Attorney, Agent, or Firm*—Akerman, Senterfitt & Eidson, P.A.

(57) ABSTRACT

In a computer system adapted for text-to-speech playback, a method for instructing a user in performing a task having a plurality of steps can include retrieving a textual instruction from a location in an electronic storage device of the computer system. The textual instruction can correspond to one or more of the steps in the task. The textual instruction can be displayed in a task automation user interface, and a text-to-speech (TTS) conversion of the textual instruction can be executed. The steps can be repeated until all textual instructions corresponding to each step in the task have been retrieved and TTS converted.

26 Claims, 5 Drawing Sheets

TASK AUTOMATION USER INTERFACE WITH TEXT-TO-SPEECH OUTPUT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field computer task automation interfacing and more particularly to such an interface having audible text-to-speech (TTS) messages.

2. Description of the Related Art

For some time computer software applications have included help screens or windows containing information for assisting users troubleshoot problems or accomplish computer-related tasks. More and more, this assistance takes the form of user interfaces that carry out and guide the user through complicated tasks and problem-solving procedures on a step-wise basis. These user interfaces are particularly well-suited for complex or infrequently-performed tasks. One type of such interfaces includes "wizards" utilized in software applications by International Business Machines Corporation and Microsoft Corporation.

Typically, these interfaces are initiated automatically, but may also be called up by a user as needed from anywhere in a software application. If an interface is initiated by the user, typically the user is prompted for information regarding the nature of the desired task so that the proper steps may be performed. Depending upon the task, the user is also prompted to supply information needed to carry out the task, such user identification, device parameters or file locations.

Such interfaces may be used, for example, to correct recognition errors when using speech recognition software, or when installing E-mail software to prompt the user to supply the telephone number and address protocol of an Internet provider as well as other such information. Another application of these interfaces is setting up and configuring hardware devices, such as modems and printers.

Typically, these interfaces display text stating instructions for carrying out each step of the task. The text may be lengthy or contain unfamiliar technical terms such that users are inclined to rapidly skim through, or completely ignore, the instructions. Some users simply choose to perform the task by trial and error. In either case, users may input the wrong information or advance to an unintended step. At a minimum, this will require the user to reenter the information or repeat the step or procedure. In some cases, such as when configuring a hardware device, the error may render the device inoperable until it is properly configured.

To improve readability and the likelihood that the instructions are conveyed to the user, most interfaces include graphical representations of key information or instructions. Additionally, some interfaces include auditory output to supplement the text and graphics. Typically, real audio is recorded, digitized and stored on the computer system as ".wav" files for playback during the interface. Auditory messages effectively ensure that the necessary information is conveyed to the user.

Graphics and audio files require a great deal of storage memory. Also, preparing audio and graphics files is time-consuming, which increases the time period for developing software. Moreover, since the audio files are pre-recorded and stored on the computer system, the audio files cannot be modified to provide auditory output of user input. As a result, the interface does not seem as though it is interacting with the user, which renders it less user-friendly.

Accordingly, a need exists in the art for a user-friendly task automation user interface providing flexible auditory output without requiring a large amount of memory space.

SUMMARY OF THE INVENTION

The present invention provides an interactive task automation user interface that produces audible messages related to performing the task. Using text-to-speech technology, instructions are stored as text, converted to audio and reproduced audibly for the user.

Specifically, the present invention operates on a computer system adapted for text-to-speech playback, to issue audible messages in a task automation user interface for performing a task. The method and system acquires message text from a location in an electronic storage device of the computer system. The message text is then converted to audio signals, which are processed to produce audible text-to-speech playback output.

Playback control input may be received from the user and then audible playback output responsive to the control input by be performed. The playback can be controlled by the user via keyboard, voice or a pointing device. Preferably, the input performs the functions of a conventional audio cassette tape player, such as play, stop, pause, forward and rewind.

The method and system can be operated to complete multi-step tasks and/or to output message text comprising a plurality of messages, in which case the above is repeated for each step or message.

The task automation user interface may be multimedia or solely auditory. Preferably, the interface includes the message text displayed on a display of the computer system. Additionally, the message text is displayed as the message is output audibly. The audible interface of the present invention also emphasizes portions of the message text.

In the event the user must supply information in order to complete a task, the task automation interface of the present invention receives personal, system or technical data from the user. This data may be entered by keyboard, pointing device and graphical interface or by voice. The input data may be converted to audio signals for audible playback output in the same or another message. The input data may also be used as control input for selecting the appropriate message or step to be converted to text and played back audibly.

Thus, the present invention provides the object and advantage of an audible interface for assisting a user to perform computer-related tasks. Audible messages increase the likelihood that the user will receive information and instructions needed to properly carry out the task the first time, particularly when a visual display is also provided. The present invention provides the additional objects and advantages that, since the messages are stored as text files, they require significantly less memory space. Further, data input by the user may be converted to text and produced audibly as well. This provides yet another object and advantage in that the audio output of the interface is highly adaptable to the current system state which greatly enhances the interactive nature of the interface.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

There are presently shown in the drawings embodiments which are presently preferred, it being understood, however, that the invention is not limited to the precise arrangements and instrumentalities shown, wherein.

DETAILED DESCRIPTION OF THE INVENTION

Figure 1:
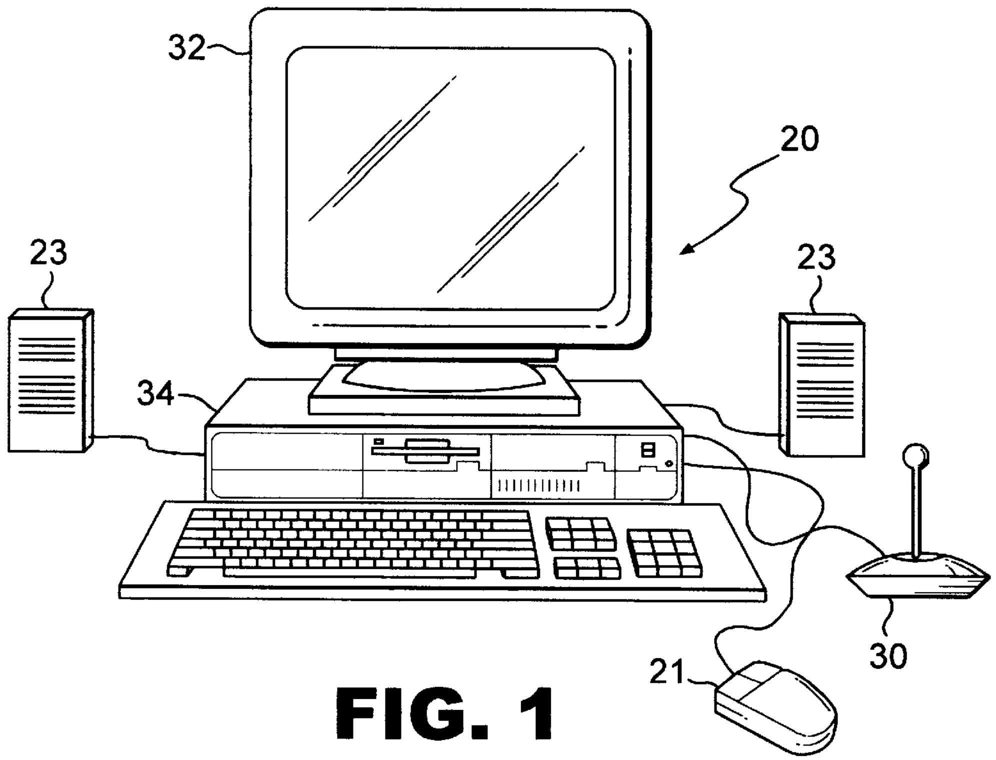
FIG. 1 shows a computer system on which the system of the invention can be used.

FIG. 1 shows a typical computer system 20 for use in conjunction with the present invention. The system is preferably comprised of a computer 34 including a central processing unit (CPU), one or more memory devices and associated circuitry. The system can also include a microphone 30 operatively connected to the computer system through suitable interface circuitry or a “sound board” (not shown), and can include at least one user interface display unit 32 such as a video data terminal (VDT) operatively connected thereto. The CPU can be comprised of any suitable microprocessor or other electronic processing unit, as is well known to those skilled in the art. An example of such a CPU includes the Pentium, Pentium II or Pentium III brand microprocessor available from Intel Corporation or any similar microprocessor. Speakers 23, as well as an interface device, such as mouse 21, can also be provided with the system.

The various hardware requirements for the computer system as described herein can generally be satisfied by any one of many commercially available high speed multimedia personal computers offered by International Business Machines Corporation (IBM). Similarly, many laptop and hand held personal computers and personal assistants may satisfy the computer system requirements as set forth herein.

Figure 2:
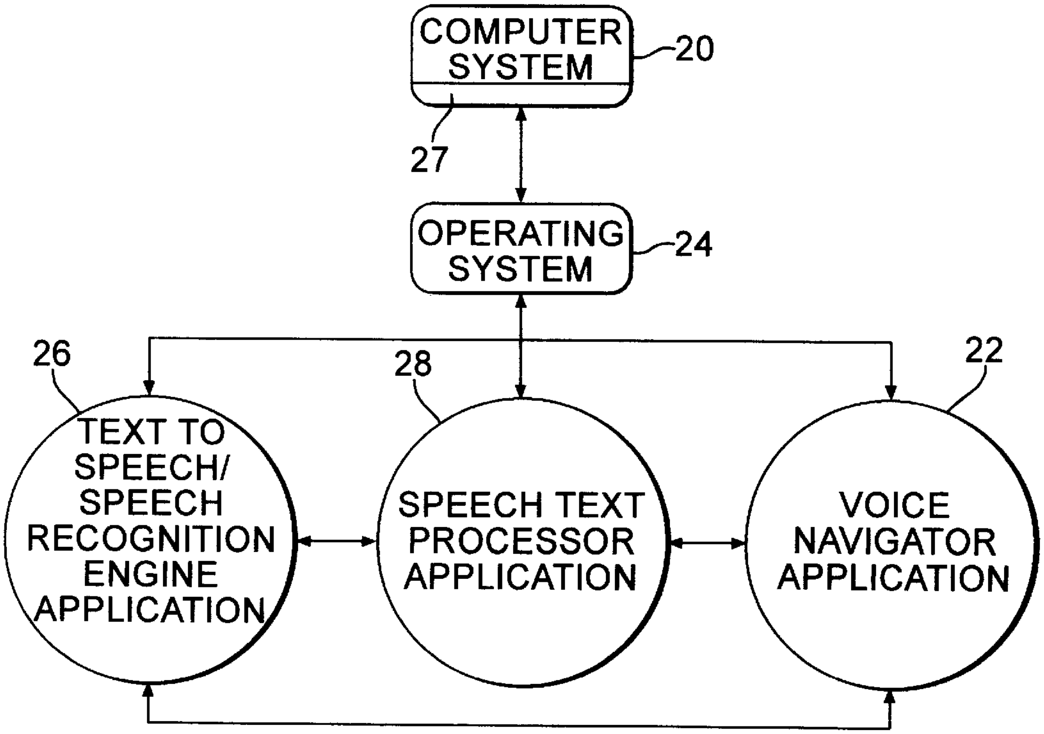
FIG. 2 is a block diagram showing a typical high level architecture for the computer system in FIG. 1.

FIG. 2 illustrates a typical architecture for a speech recognition system in computer 20. As shown in FIG. 2, computer system 20 includes a computer memory device 27, which is preferably comprised of an electronic random access memory and a bulk data storage medium, such as a magnetic disk drive. The system typically includes an operating system 24 and a text-to-speech(TTS)/speech recognition engine application 26. A speech text processor application 28 and a voice navigator application 22 can also be provided.

TTS/speech recognition engines are well known among those skilled in the art and provide suitable programming for converting text to speech and for converting spoken commands and words to text. Generally, the text to speech engine 26 converts electronic text into phonetic text using stored pronunciation lexicons and special rule databases containing pronunciation rules for non-alphabetic text. The TTS engine 26 then converts the phonetic text into speech sounds signals using stored rules controlling one or more stored speech production models of the human voice. Thus, the quality and tonal characteristics of the speech sounds depends upon the speech model used. The TTS engine 26 sends the speech sound signals to suitable audio circuitry, which processes the speech sound signals to output speech sound via through the speakers 23.

In FIG. 2, the TTS/speech recognition engine 26, speech text processor 28 and the voice navigator 22 are shown as separate application programs. It should be noted however that the invention is not limited in this regard, and these various application could, of course be implemented as a single, more complex application program. Also, if no other speech controlled application programs are to be operated in conjunction with the speech text processor application and speech recognition engine, then the system can be modified to operate without the voice navigator application. The voice navigator primarily helps coordinate the operation of the speech recognition engine application.

Audio signals representative of sound received in microphone 30 are processed within computer 20 using conventional computer audio circuitry so as to be made available to the operating system 24 in digitized form. The audio signals received by the computer are conventionally provided to the TTS/speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3:
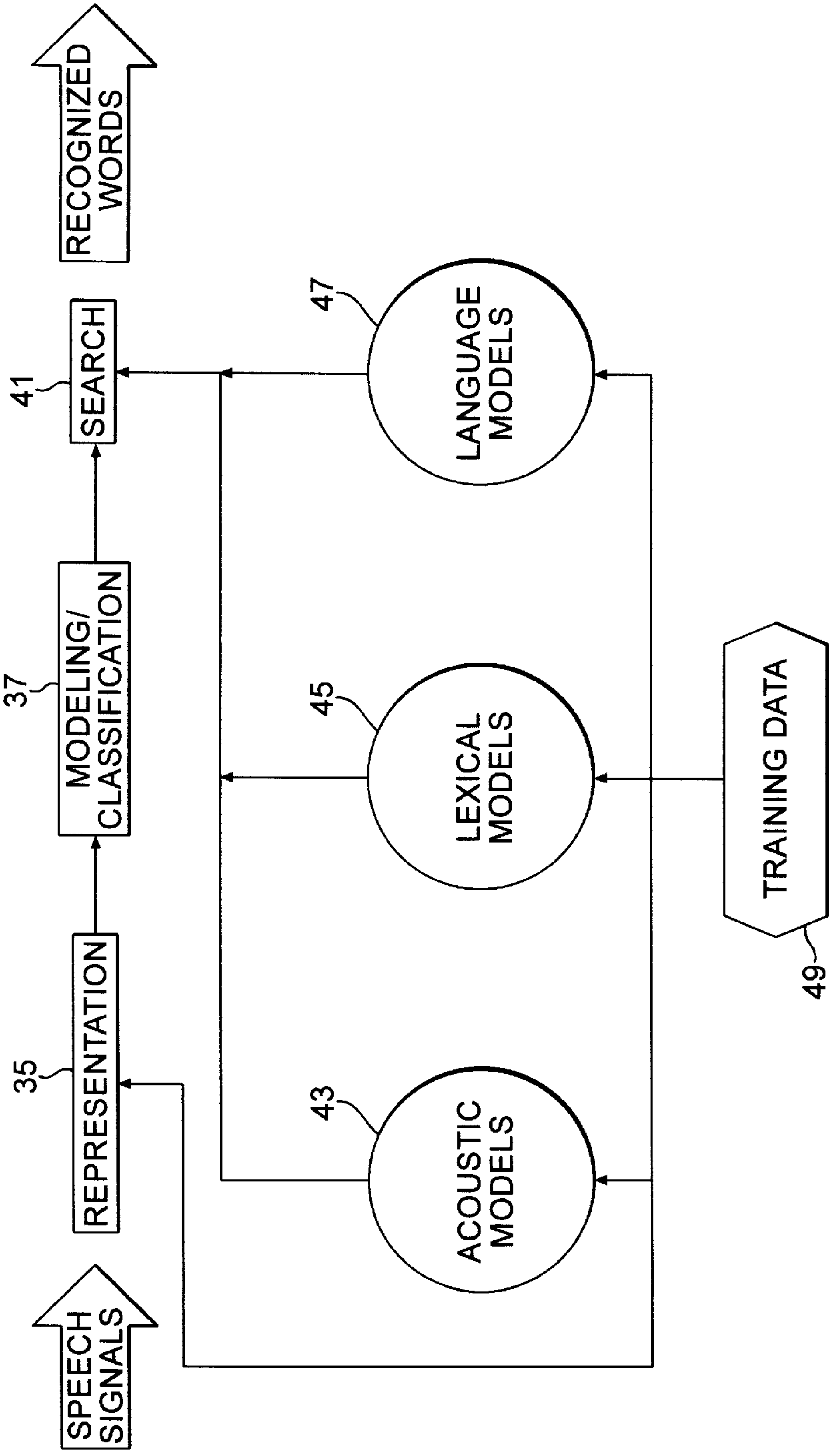
FIG. 3 is a block diagram showing a typical architecture for a speech recognition engine.

FIG. 3 is a block diagram showing typical components which comprise the speech recognition portion of the TTS/speech recognition application 26. As shown in FIG. 3, the speech recognition engine receives a digitized speech signal from the operating system. The signal is subsequently transformed in representation block 35 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In modeling/classification block 37, algorithms process the speech signals further to adapt speaker-independent acoustic models to those of the current speaker. Finally, in search block 41, search algorithms are used. to guide the search engine to the most likely words corresponding to the speech signal. The search process in search block 41 occurs with the help of acoustic models 43, lexical models 45, language models 47 and other training data 49.

Language models 47 are used to help restrict the number of possible words corresponding to a speech signal when a word is used together with other words in a sequence. The language model can be specified very simply as a finite state network, where the permissible words following each word are explicitly listed, or can be implemented in a more sophisticated manner making use of context sensitive grammar.

In a preferred embodiment which shall be discussed herein, operating system 24 is one of the Windows family of operating systems, such as Windows NT. Windows 95 or Windows 98 which are available from Microsoft Corporation of Redmond, Wash. However, the system is not limited in this regard, and the invention can also be used with any other type of computer operating system. For example the invention may be implemented in a hand-held computer operating system such as Windows CE which is available from Microsoft Corporation of Redmond, Wash., or in a client-server environment using, for example, a Unix operating system. The system as disclosed herein can be implemented by a programmer, using commercially available development tools for the operating systems described above.

Figure 4:
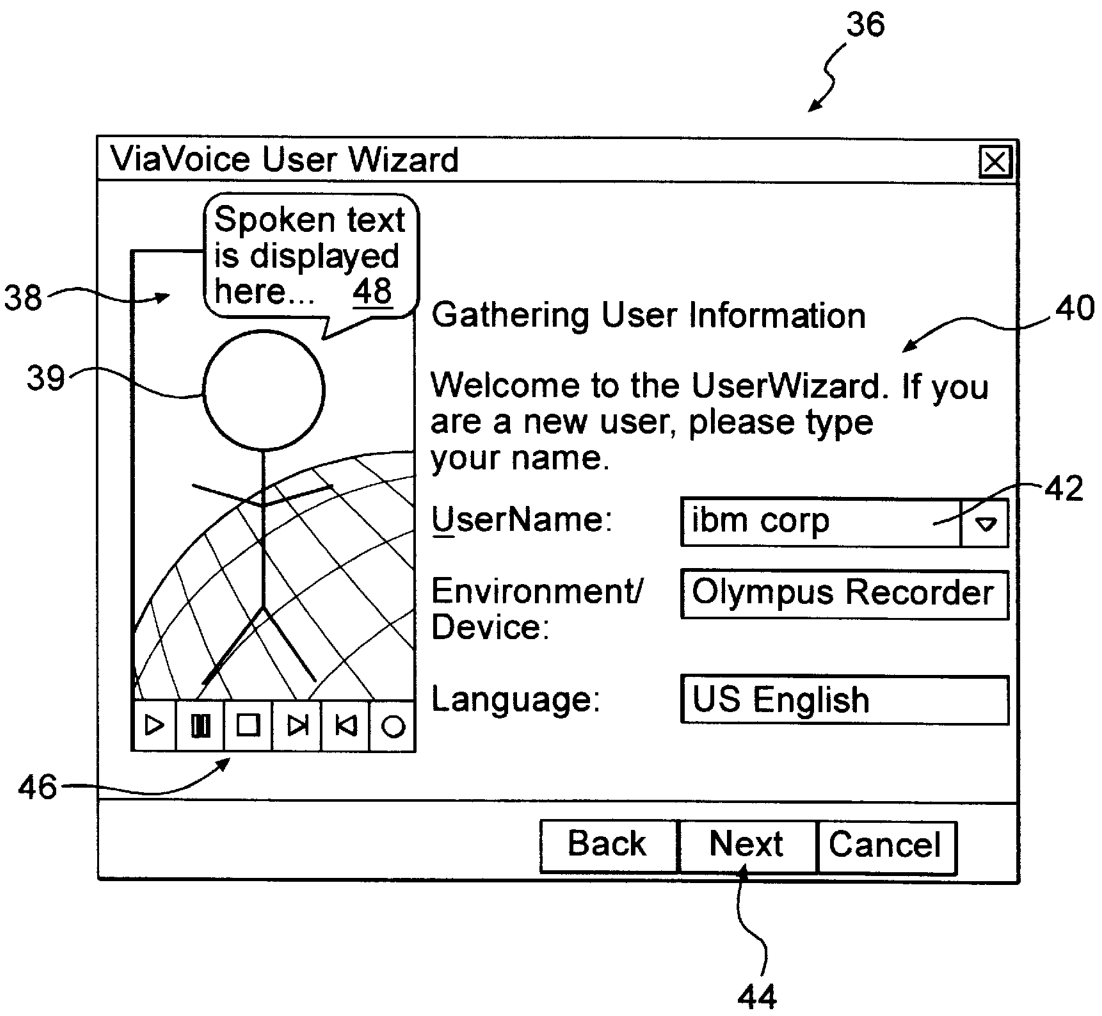
FIG. 4 is a an example of an interface window for the text-to-speech task automation user interface of the present invention.

FIG. 4 illustrates a graphical user interface window 36 for permitting the user to communicate with the system. The window 36 can include graphics 38, animation 39, text 40, variable text fields 42 and window display/process control buttons 44. Preferably, the window also includes playback control buttons 46 and a message text read-out field, such as text balloon 48. These components of the display window 36 will be described in detail below.

Figure 5A:
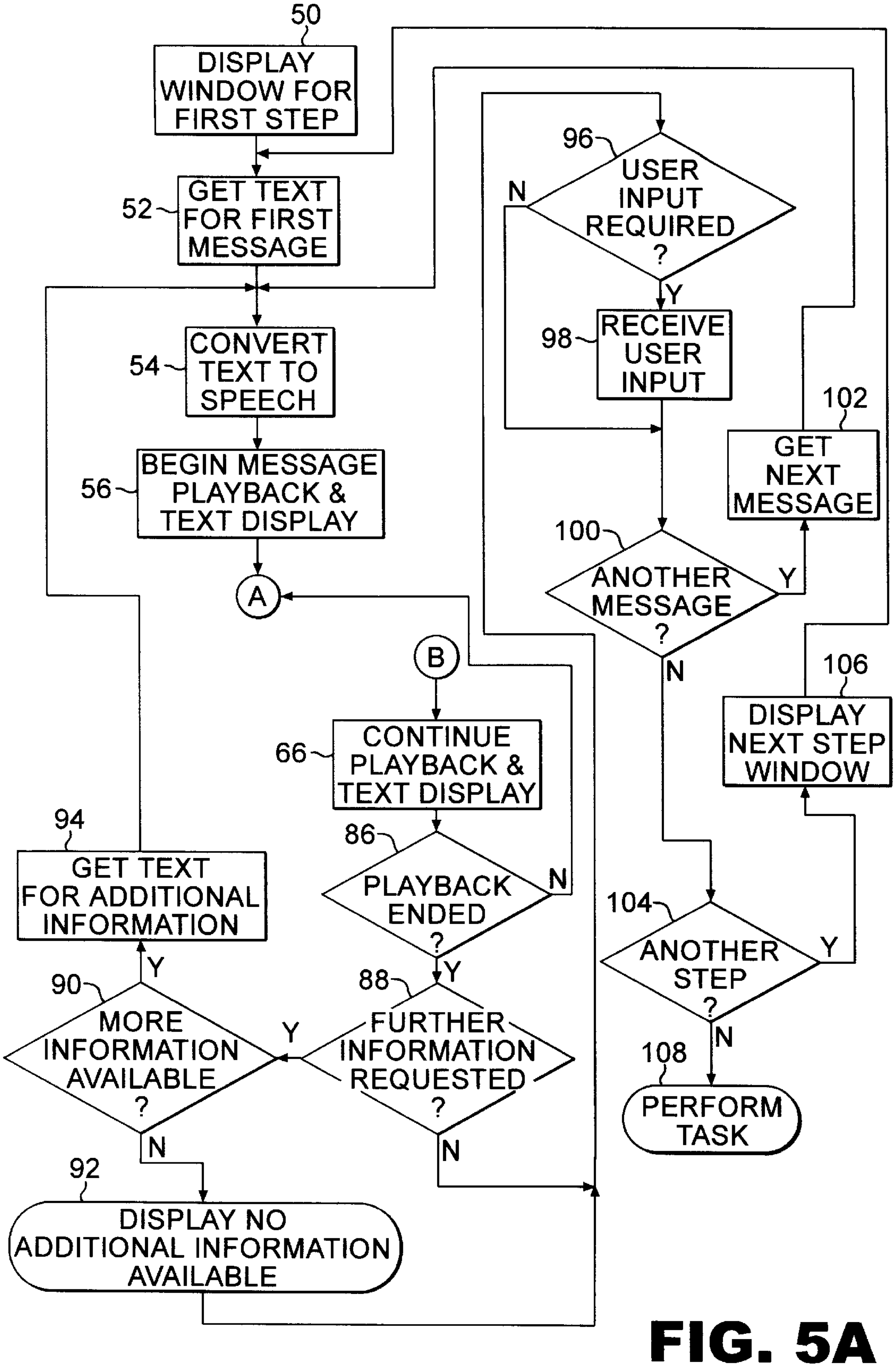
FIG. 5A is a flow chart illustrating a process for automating a task and providing text-to-speech instructions to a user.
Figure 5B:
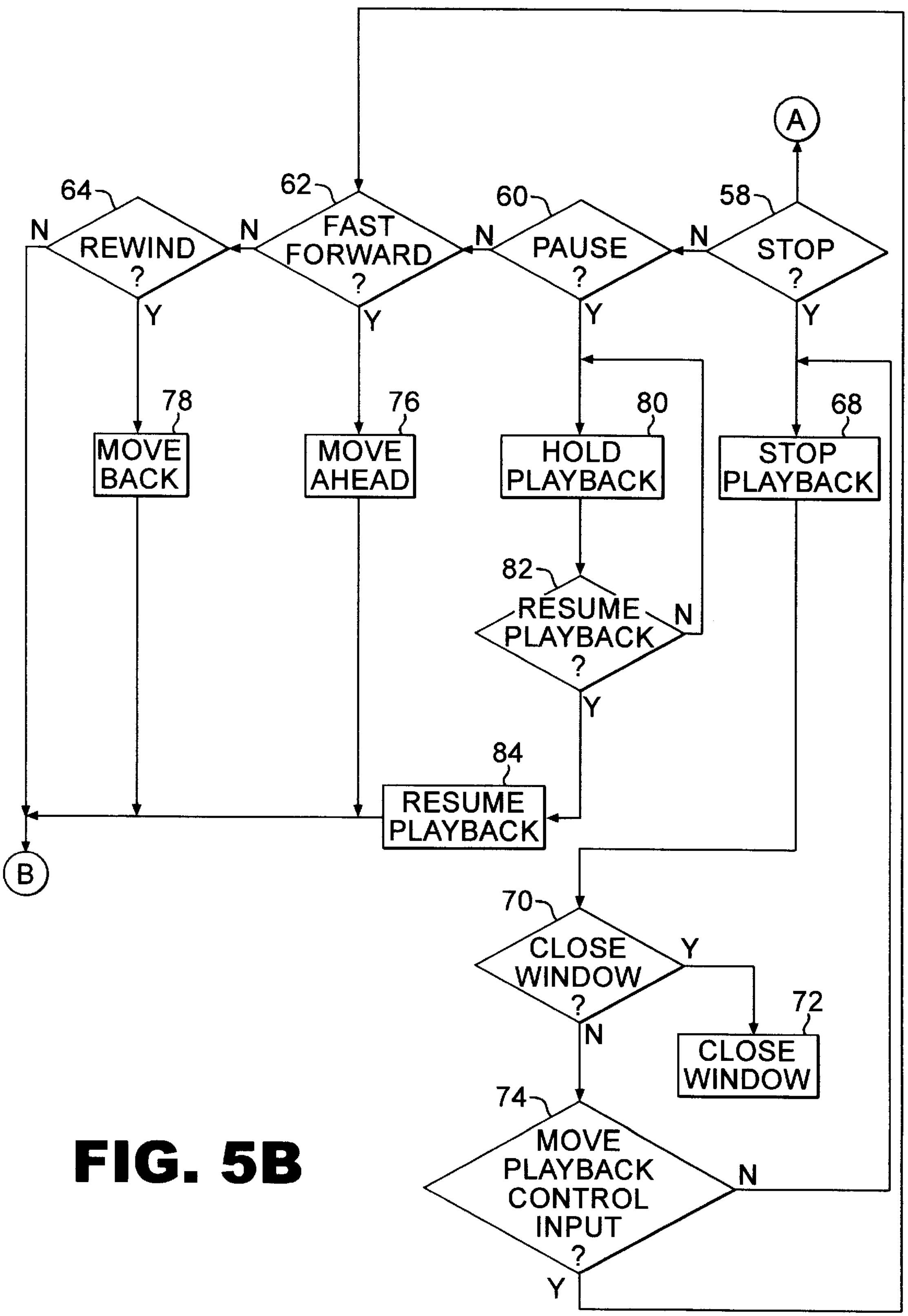
FIG. 5B is a flow chart illustrating a process for user control of the playback of the text-to-speech instruction of FIG. 5A.

FIGS. 5A–5B is a flow chart illustrating the process for providing a task automation user interface with text-to-speech audible messages according to the invention. The messages may include instructions for performing the task or inputting data or other information.

FIGS. 4 and 5 illustrate an implementation of the invention where a user display is available such as in the case of a desktop personal computer. It will be appreciated from the description of the process in FIG. 5A–5B, however, that a visual display system interface such as is shown in FIG. 4 is not required. Instead, the interface may be entirely based on audio, utilizing speech recognition to control playback or input information and text-to-speech programming to output audible messages and instructions for performing the tasks.

To the extent that speech commands may be used to control the operation of the interface as disclosed herein, audio signals representative of sound received in microphone 30 are processed within computer 20 using conventional computer audio circuitry so as to be made available to the operating system 24 in digitized form. The audio signals received by the computer are conventionally provided to the TTS/speech recognition engine application 26 via the computer operating system 24 in order to perform speech recognition functions. As in conventional speech recognition systems, the audio signals are processed by the speech recognition engine 26 to identify words spoken by a user into microphone 30.

Referring to FIG. 5A, automatically or upon user initiation, at process block 50 a graphical interface window, such as window 36, is displayed for the first step of the task. The text for the first audible message is retrieved from a text file stored in the memory 27, at block 52. All the message text may be contained in a single text file or each message may be stored in a separate file. At block 54, the retrieved message text is then converted to audio or speech signals by a text-to-speech software engine, as known in the art. These audio signals are made available to the operating system 24 in digitized form and are subsequently processed within computer 20 using conventional computer audio circuitry. The audio thus generated by the computer is conventionally reproduced by the speakers 23

Using text-to-speech technology provides two primary benefits: (1) it greatly decreases the amount of storage space required for audible interfaces of this kind, an (2) it increases the flexibility, interactivity and user-friendliness of the interface. First, storing the messages as text files significantly reduces the amount of memory required compared to storing audio files. For example, storing thirty minutes of 16 bit, single channel audio recorded at 44 kHz requires approximately 100 MB of memory. In contrast, the same amount of messaging can be stored as a text file in approximately 30 kB of memory, and the TTS engine requires approximately 1.2 MB. Thus, the present invention can operate using dramatically less storage space than typical audible interfaces. Second, the interface is more interactive, in part, because the reduction in memory requirements allows for a greater quantity of messages. Also, the fact that the messages are converted to audio signals rather than pre-recorded, the audio output can include text input by the user, giving the user a greater sense of interactivity.

Referring again to FIG. 5A, at block 56 the message playback is begun and the message is displayed in the read-out text field 48. The text may be displayed at once and remain displayed until the message or step is completed. Alternatively, the text may be displayed substantially as it is reproduced audibly, displaying only a few words, phrases or sentences at one time. The actor 39 may also be animated at block 56 so as to give the appearance of speaking to the user, for example, by pointing to parts of the interface being referred to audibly.

Referring to FIG. 5B, according to a preferred embodiment, the playback continues until completed unless otherwise interrupted by a user playback control input. The user can control the playback much like a conventional cassette tape or compact disc player. Using a familiar control format such as this enhances the usability of the interface. By issuing voice commands or depressing the graphical control buttons 46 with a pointing device, the user may stop or pause the playback, skip ahead to or replay various portions of the message.

Specifically, blocks 58, 60, 62, and 64 are decision steps which correspond to user control over the playback process which may be implemented by voice command or other suitable interface controls. The system determines whether the user inputs a "play", "stop", "pause", "fast forward" or "rewind" control signal. If not, the process continues to block 66 (FIG. 5A) where the display and playback of the message continues.

Otherwise, for example, if the user inputs a "stop" command, the process advances to step 68 where the playback and text display is stopped. At this point, if the user wishes to terminate the interface, block 70, by depressing the "cancel" process control button 44, for example, then the window is closed at block 72. If the user stopped the playback but continues with the task, the process advances to block 74, where the system awaits additional playback control input from the user. If no input is received, the playback and display remain the same. However, if additional input is received, the process returns to block 62 where the user can move the playback ahead, block 76, or back, block 78 and then continue the playback at block 66 (FIG. 5A).

Alternatively, rather than stopping the playback completely, at block 60, the user may pause it temporarily to digest the instruction, locate system or personal data for inputting or for any other reason. The playback is held at the paused position, block 80. At block 82, the system determines whether an input signal has been received to resume playback. If not the playback remains paused, otherwise it is resumed at block 84.

If playback is continued, at block 86, the above described process is repeated until the playback is ended. In particular, if the playback of the current message is not completed, then the system returns to monitoring system inputs for user playback commands as described. Once it is completed, the user can request additional information or instruction regarding the current step, block 88, using a suitable voice command or point and click method. At block 90, the system determines whether additional text is stored in memory relating to the current step. If not, visually or audibly, the system conveys to the user that there is no further help or information, block 92. However, if there is, at block 94, the text is retrieved and then the process returns to block 54 where the additional text is converted to speech and played back as described. The user may control the playback of the additional information message as described above.

If no further information is requested or available, the process advances to block 96 to determine if the user must supply data for variables needed to complete the step of the task. If so, the system receives the user input at block 98 in a suitable form, such as typed or dictated text in text field 42, a list selection or a check mark indicator. The system then uses the user-supplied data as needed to determine and undertake the steps necessary to complete the task. The user input may also be used in step 100 to determine the appropriate message to play next or whether any appropriate messages remain for the current step. If no such user data is required, the process advances directly to block 100 where the system determines whether another message or instruction exists for the current step. Usually this is accomplished by scanning the text file for markers or tags designating the task to which it pertains and at which point it is to be played. If there is another message it is retrieved at block 102 after which the process returns to block 54 where the message is converted to speech and played, as described. Playback of the new message may be commenced automatically or in response to user input. If there is not another message for the current step, then at block 104 the system determines whether another step is needed to perform the task, again, user input received at block 98 may be used in making this determination. If there is another step, the next window is displayed, at block 106, and the process returns to block 52 where the first message for the new step is retrieved, converted and played. Finally, at block 108, if there are no additional messages to play and steps to complete, the task is performed by supplying the user inputted data and other scripted commands to the applicable software application, as known in the art.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. In a computer system adapted for text-to-speech playback, a method for instructing a user in performing a computer related task having a plurality of steps, said method comprising the Steps of (a) displaying a task automation graphical user interface having at least a first portion for displaying textual instructions, and a second portion for controlling text-to-speech playback (TTS) of said textual instructions;

(b) retrieving a textual instruction from a location in an electronic storage device of said computer system, said textual instruction corresponding to at least one of said steps in said task;

(c) displaying said textual instruction in said first portion of said task computer related automation graphical user interface;, (d) executing a text-to-speech (TTS) conversion of said textual instruction; and, (e) repeating steps.(b)–(d) until all textual instructions Corresponding to each step in said computer related task have been retrieved and TTS converted.

2. The method according to claim 1, further comprising the steps of: receiving from said user data input for performing said step; and, executing a TTS conversion of said received user data.

3. The method according to claim 2, wherein said user data input is playback control input identifying a next textual instruction for retrieving, displaying in said first portion of said task automation graphical user interface and executing said TTS conversion.

4. The method according to claim 1, further comprising the steps of receiving playback control input from said user; and, performing steps (b)–(e) responsive to said control input.

5. The method according to claim 4, wherein said playback control input is a voice command issued by said user.

6. The method according to claim 4, wherein said playback control input is one of a keyboard input and a pointing device input.

7. The method according to claim 4, wherein said playback control is at least one of the functions for controlling a conventional audio cassette tape player.

8. The method according to claim 1, wherein said executing step comprises the steps of:

converting said textual instruction to audio signals; and, processing said audio signals to produce audible TTS playback output.

9. The method according to claim 8, wherein said audible TTS playback output emphasizes portions of said textual instruction.

10. The method according to claim 8, wherein said displaying step comprises the step of displaying said textual instruction substantially as said textual instruction is output audibly.

11. The method according to claim 1, furthers comprising the steps of providing a graphical actor in a third portion of said task automation graphical user interface;

animating said graphical actor; and, choreographing said animating step with said executing step so as to give an appearance of said graphical actor speaking to said user.

12. A computer system adapted for text-to-speech playback to instruct a user in performing a computer related task having a plurality of steps, comprising:

a task automation graphical user interface having at least a first portion for displaying textual instructions, and a second portion for controlling text-to-speech playback (TTS) of said textual instructions;

acquisition means for acquiring a textual instruction from a location in an electronic storage device of said computer system, said textual instruction corresponding to at least one of said steps in said computer related task;

display means for displaying said textual instruction in said first portion of said task automation graphical user interface;

a text-to-speech (TTS) engine software application for converting said textual instruction to audio signals;

processor means for processing said audio signals; and, reproduction means for performing audible TTS playback output according to said processed audio signals.

13. The system according to claim 12, further comprising input means for receiving from said user data input for performing said step, wherein said user data input is converted to audio signals for audible playback output.

14. The system according to claim 13, wherein said user data input comprises playback control input for identifying a next textual instruction for acquiring, displaying in said first portion of said task automation graphical user interface and executing said TTS conversion.

15. The system according to claim 12, further comprising input means for receiving playback control input from said user, wherein said reproduction means performs audible TTS playback output responsive to said control input.

16. The system according to claim 15, further comprising a speech recognition engine, wherein said playback control input is a voice command issued to said speech recognition engine by said user.

17. The system according to claim 15, wherein said playback control input is one of a keyboard input and a pointing device input.

18. The system according to claim 15, wherein said playback control input comprises at least one of the functions for controlling a conventional audio cassette tape player.

19. The system according to claim 15, wherein said playback control input comprises at least one of a play control, stop control, pause control, forward control or rewind control.

20. The system according to claim 12, wherein said audible TTS playback output emphasizes portions of said textual instruction.

21. The system according to claim 12, wherein said textual instruction is displayed substantially as said textual instruction is output audibly.

22. The system according to claim 12, further comprising:

means for providing a graphical actor in a third portion of said task automation graphical user interface;

animation means for animating said graphical actor; and, choreography means for synchronizing said animation of said graphical actor with said audible TTS playback output so as to give an appearance of said graphical actor speaking to said user.

23. A machine readable storage, having stored thereon a computer program having a plurality of code sections executable by a machine for causing the machine to perform the steps of:

(a) displaying a task automation graphical user interface having at least a first portion for displaying textual instructions, and a second portion for controlling text-to speech playback (TTS) of said textual instructions:

(b) retrieving a textual instruction for performing a computer related task from a location in an electronic storage device, said textual instruction corresponding to at least one of a plurality of steps in said computer related task;

(c) displaying said textual instruction in said first portion of said task autornation graphical user interface;

(d) executing a text-to-speech (TTS) conversion of said textual instruction; and, (e) repeating steps,(b)–(d) until all textual instructions corresponding to each step in said computer related task have been retrieved and TTS converted, whereby steps (a)–(e) audibly and visually instruct said user in performing said computer related task.

24. The machine readable storage according to claim 23, having a program causing the machine to perform the further steps of:

receiving from said user data input for performing said step; and, executing a TTS conversion of said received user data.

25. The machine readable storage according to claim 23, shaving a program causing the machine to perform the further steps of:

receiving playback control input from said user; and, performing steps (b)–(e) responsive to said control input.

26. The machine readable storage according to claim 23, having a program causing the machine to perform the further steps of:

providing a graphical actor in a third portion of said task automation graphical user interface;

animating said graphical actor; and, choreographing said animating step with said executing step so as to give an appearance of said graphical actor speaking to said user.

* * * * *